US011580862B2

United States Patent
Sujan et al.

(10) Patent No.: US 11,580,862 B2
(45) Date of Patent: Feb. 14, 2023

(54) INTERFACES FOR ENGINE CONTROLLER AND PLATOONING CONTROLLER

(71) Applicant: Cummins Inc., Columbus, IN (US)

(72) Inventors: Vivek Anand Sujan, Columbus, IN (US); Christine L. Hilmer, Greenwood, IN (US); Ethan Charles Seifer, Hope, IN (US); Howard Robert Frost, Columbus, IN (US)

(73) Assignee: Cummins Inc., Columbus, IN (US)

( * ) Notice: Subject to any disclaimer, the term of this patent is extended or adjusted under 35 U.S.C. 154(b) by 415 days.

(21) Appl. No.: 16/896,874

(22) Filed: Jun. 9, 2020

(65) Prior Publication Data

US 2020/0301444 A1 Sep. 24, 2020

Related U.S. Application Data

(63) Continuation of application No. PCT/US2018/065666, filed on Dec. 14, 2018.
(Continued)

(51) Int. Cl.
*G08G 1/16* (2006.01)
*G08G 1/00* (2006.01)
(Continued)

(52) U.S. Cl.
CPC .............. *G08G 1/22* (2013.01); *B60W 10/06* (2013.01); *B60W 30/143* (2013.01);
(Continued)

(58) Field of Classification Search
CPC ........ B60W 30/143; B60W 2710/0666; G08G 1/22
See application file for complete search history.

(56) References Cited

U.S. PATENT DOCUMENTS 9,645,579 B2 5/2017 Switkes et al.
9,665,102 B2 5/2017 Switkes et al.
(Continued)

FOREIGN PATENT DOCUMENTS

WO 2015047175 4/2015

OTHER PUBLICATIONS

Chinese Office Action from Counter Chinese Application, CN Serial No. 201880089366.7, dated Jan. 5, 2022, 10 pgs.
English Translation of Chinese Office Action from Counter Chinese Application, CN Serial No. 201880089366.7, dated Jan. 5, 2022, 9 pgs.
(Continued)

*Primary Examiner* — Edwin A Young
(74) *Attorney, Agent, or Firm* — Taft, Stettinius & Hollister LLP

(57) ABSTRACT

A control system for a vehicle includes an engine controller operable to determine a requested engine torque in response to a cruise control set command and a cruise control offset value, determine an engine torque command in response to the requested engine torque and a torque limit, and control operation of an engine in response to the engine torque command. The control system also includes a platooning controller operable to determine and provide to the engine controller the cruise control set command, the cruise control offset value and the torque limit effective to cause the engine controller to control the engine to provide a desired following distance between the vehicle and a second vehicle.

18 Claims, 7 Drawing Sheets

Related U.S. Application Data

(60) Provisional application No. 62/598,506, filed on Dec. 14, 2017.

(51) Int. Cl.
  *B60W 10/06* (2006.01)
  *B60W 30/16* (2020.01)
  *B60W 30/165* (2020.01)
  *G05D 1/02* (2020.01)
  *B60W 30/14* (2006.01)

(52) U.S. Cl.
  CPC ........ *B60W 30/162* (2013.01); *B60W 30/165* (2013.01); *G05D 1/0293* (2013.01); *G05D 1/0295* (2013.01); *B60W 2510/0657* (2013.01); *B60W 2710/0666* (2013.01); *B60W 2710/083* (2013.01)

(56) References Cited

U.S. PATENT DOCUMENTS

| | | |
|---|---|---|
| 2002/0152015 A1 | 10/2002 | Seto |
| 2007/0255486 A1* | 11/2007 | Gruenter ............. F02D 41/0002 |
| | | 123/399 |
| 2009/0111652 A1 | 4/2009 | Reedy et al. |
| 2014/0052344 A1 | 2/2014 | Tsuda et al. |
| 2016/0221576 A1* | 8/2016 | Wang ................... B60W 10/06 |
| 2017/0080931 A1* | 3/2017 | D'Amato ........ B60W 30/18072 |
| 2017/0308097 A1 | 10/2017 | Switkes et al. |
| 2017/0344023 A1 | 11/2017 | Laubinger et al. |

OTHER PUBLICATIONS

Search Report and Written Opinion , PCT Appln. No. PCT/US18/065666, 8 pgs. dated Mar. 1, 2019 2019.

Alam et al., Look-Ahead Cruise Control for Heavy Duty Vehicle Platooning. Proceedings of the 16th International IEEE Annual Conference on Intelligent Transportation Systems. Oct. 6, 2013.

* cited by examiner

| Parameter Groups | Update Rate | Specific Parameters | 500k DO OBD and Vehicle Network | 500k OBD Network | 250k DO 250k OBD | 250k Vehicle Network |
|---|---|---|---|---|---|---|
| Cruise Control / Vehicle Speed 2 (CCVS2) | Every 100 ms and on change but no faster than 20 ms | Cruise Control Disable Command | RX | no | | RX |
| | | Cruise Control Resume Command | RX | no | | RX |
| SA=ACC DA=Engine | | Cruise Control Pause Command | RX | no | | RX |
| | | Cruise Control Set Command | | | | |

INTERFACES FOR ENGINE CONTROLLER AND PLATOONING CONTROLLER

CROSS-REFERENCE TO RELATED APPLICATIONS

The present application is a continuation of International Application No. PCT/US18/65666 filed on Dec. 14, 2018, which claims the benefit of the filing date of U.S. Provisional Application Ser. No. 62/598,506 filed on Dec. 14, 2017, each of which is incorporated herein by reference in its entirety for all purposes.

BACKGROUND

The present application relates to interfaces for engine controllers and autonomous controllers. Vehicle platooning offers to the possibility of decreased fuel consumption and greater fuel economy through the coordinated operation of a group of vehicles traveling along a route. For example, controlling operation of a following vehicle to maintain a specified following distance from a leading vehicle may reduce aerodynamic losses experienced by the following vehicle. To provide such operation a controller may be operated to provide torque commands to the engine in order to achieve a specified following distance. The commands provided by the controller may override or take precedence over other commands used by the engine controller. However, the interface between an autonomous controller and an engine controller can create a number of unintended and undesirable consequences including effects impacting communication between an engine controller and a transmission controller or effects impacting transmission shifting. There remains a significant unmet need for the unique apparatuses, methods and systems disclosed herein.

DISCLOSURE OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

Exemplary embodiments include unique interfaces for an engine controller and an autonomous controller and unique apparatuses, methods and systems including or utilizing such interfaces. Further embodiments, forms, objects, features, advantages, aspects, and benefits shall become apparent from the following description and drawings.

BRIEF DESCRIPTION OF THE DRAWINGS

FIG. 7 is a table illustrating certain aspects of an exemplary extended modified cruise control/vehicle speed message.

DETAILED DESCRIPTION OF ILLUSTRATIVE EMBODIMENTS

Figure 1:
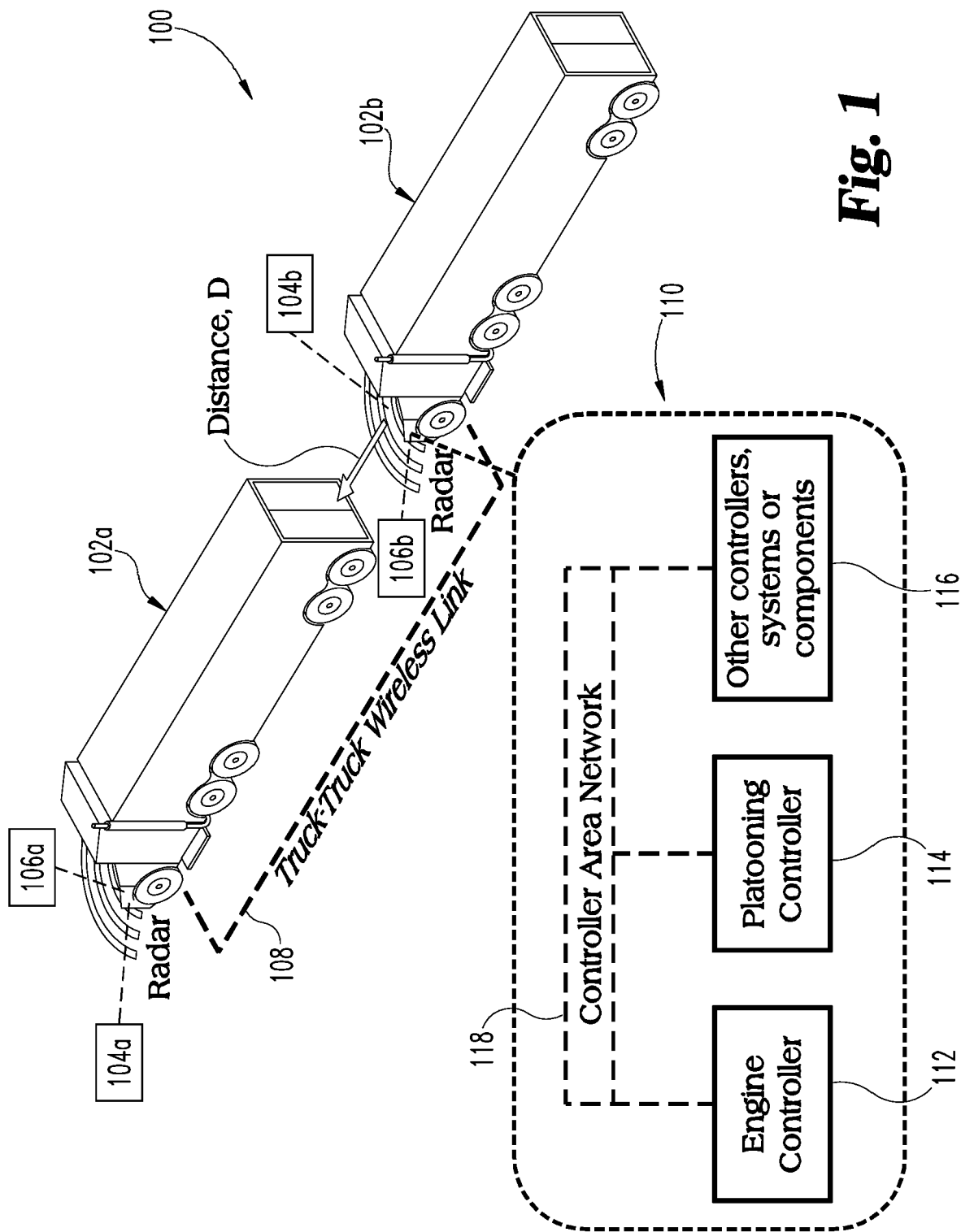
FIG. 1 is a schematic diagram illustrating certain aspects of an exemplary vehicle platoon.

With reference to FIG. 1 there is illustrated a schematic diagram illustrating certain aspects of an exemplary system for a vehicle platoon 100 including a plurality of vehicles 102a, 102b, etc. (collectively and individually referred to as vehicle(s) 102 herein.) The vehicles 102 in the vehicle platoon 100 are operable to act in a coordinated manner to reduce net fuel consumption and increase net operating efficiency relative to uncoordinated operation. The illustrated vehicle platoon 100 includes two platooning trucks operating in line haul highway conditions. The front truck (vehicle 102a) is under driver torque control (e.g., through direct throttle pedal or cruise control). The rear truck (vehicle 102b) maintains a following distance D to the front truck using a platooning controller 114 structured to interface with an engine controller 112 in a vehicle electronic control system 110 via a communication network 118.

While two vehicles are illustrated in the vehicle platoon 100 of FIG. 1, it shall be appreciated that the vehicle platoon 100 may comprise any number of two or more vehicles 102 controlled or operating in a coordinated manner. The vehicles 102 illustrated in FIG. 1 are tractor-trailer vehicles, however, the vehicles in the vehicle platoon may be a variety of types of vehicles such as trucks, tractor-trailers, box trucks, busses, and passenger cars, among others. Some embodiments contemplate that vehicles 102 in the vehicle platoon 100 may each be the same or similar types of vehicles, for example, in the case of a commonly managed vehicle fleet. Some embodiments contemplate that vehicles 102 in the vehicle platoon 100 may comprise different types or classes of vehicles, for example, semi tractor-trailers and passenger cars.

Each of the vehicles 102a, 102b in the vehicle platoon 100 includes an engine 104a, 104b, respectively, such as an internal combustion engine or hybrid engine-electric system or any suitable prime mover, structured to output power to propel the respective vehicle 102a, 102b. Some embodiments contemplate that engines 104, 104b may each be the same or similar types of prime movers, for example, in the case of a commonly managed vehicle fleet. Some embodiments contemplate that engines 104a, 104b may comprise different types or classes of prime movers, for example, prime movers of different sizes, powers or types (e.g., diesel engine powertrains, gasoline engine powertrains, natural gas powertrains, hybrid-electric powertrains, and electric powertrains). For ease of description the engine 104a, 104b (collectively and individually also referred to as engine mover 104) of a vehicle 102 may be any suitable prime mover and there the use of the term "engine" is not limited to an internal combustion engine, and it shall be understood that these references also apply to and include other types of prime movers.

Vehicles 102a, 102b in the vehicle platoon 100 may utilize one or more environmental sensor or sensor systems 106a, 106b (collectively and individually referred to as sensor systems 106) to determine its positioning relative to other vehicles 102 in the vehicle platoon 100. Examples of the types of sensor systems 106 that may be utilized include radar systems, lidar systems, proximity sensor systems, and combinations of these and/or other sensor systems. The vehicles 102 in the vehicle platoon 100 also include a wireless communication system or link 108 allowing vehicle-to-vehicle (V2V) communication or vehicle-to-X (V2X) communication where X denotes a variety of possible types of external networks.

Vehicles 102 in the vehicle platoon 100 may each include a vehicle electronic control system (VECS) 110 which is structured to control and monitor operation of a respective vehicle 102, as well as to participate in cohort mode coordinated operation as disclosed herein. The VECS 110 typically comprises a plurality of integrated circuit-based electronic control units (ECU) or other control components which may be operatively coupled to one other over a communication network 118 and which are structured to implement a number of different controls.

For example, the illustrated VECS 110 includes an engine controller 112, a platooning controller 114 and may also include one or more other controllers, systems or components 116 such as sensors and actuators which are operatively coupled with the communication network 118. Platooning controller 114 is used in the discussion that follows, but it should be understood that platooning controller 114 can be any autonomous controller. These controllers may be implemented in one or more ECUs. For example, certain embodiments include an engine ECU structured implement the engine controller 112 to control and monitor operation of an engine and engine accessories as described herein, a platooning ECU structured to implement the platooning controller 114 to control and monitor platooning operation as described herein, a transmission ECU structured to control and monitor operation of a transmission (not shown), a wireless communication ECU structured to control vehicle wireless communication system 108, and one or more environmental sensor ECUs structured to control operation of an environmental sensor system 106 may be provided.

In certain embodiments two or more of these controllers may be implemented in a common ECU. It shall further be appreciated that the control logic and control processes disclosed herein may be performed by controllers or controls which are implemented in dedicated control components of VECS 110 (e.g., in a dedicated ECU or other dedicated control circuity) or may be implemented in a distributed fashion across multiple control components of VECS 110 (e.g., through coordinated operation of an engine ECU, a transmission ECU, a wireless communication ECU and an environmental sensor ECU).

The controllers, ECUs and other control components of a VECS 110 may include digital circuitry, analog circuitry, or a hybrid combination of both of these types. The ECUs and other control components of VECS 110 can be programmable, an integrated state machine, or a hybrid combination thereof. The ECUs and other control components of VECS 110 can include one or more Arithmetic Logic Units (ALUs), Central Processing Units (CPUs), memories, limiters, conditioners, filters, format converters, or the like which are not shown to preserve clarity. In one form, the vehicle electronic control system 110 is of a programmable variety that executes algorithms and processes data in accordance with operating logic that is defined by executable program instructions stored in a non-transitory memory medium (e.g., software or firmware). Alternatively or additionally, operating logic for the vehicle electronic control system 110 can be at least partially defined by hardwired logic or other hardware.

The environmental sensor and wireless communication capabilities of the vehicles 102 allow their operation to be coordinated using direct and/or indirect communication. Such operation may be referred to as coordinated operation or cohort mode operation. For example, the vehicles 102 may accelerate or brake simultaneously, or in a coordinated sequence, maintain a particular distance relative to one other, or maintain a particular offset relative to one another. Coordinated operation also allows a closer following distance between vehicles by compensating for or eliminating reacting distance needed for human reaction. Coordinate operation of the vehicle platoon 100 further allows for operation that reduces net fuel consumption or increases net efficiency of the vehicle platoon 100. One or more of the vehicles 102 may in some embodiments, be equipped with aerodynamic capability (wind assist panels on cab & trailer, aerodynamic tractor body) that creates a laminar flow of air (tunnel effect) that greatly reduces air drag. Other vehicles 102 among the platoon 100 may be spaced close enough to the vehicle 102 taking advantage of a wind break tunnel to increase fuel economy. It shall be appreciated that the controls disclosed herein can mitigate aerodynamic losses both by adjusting vehicle following distance(s) and vehicle offset.

Figure 2:
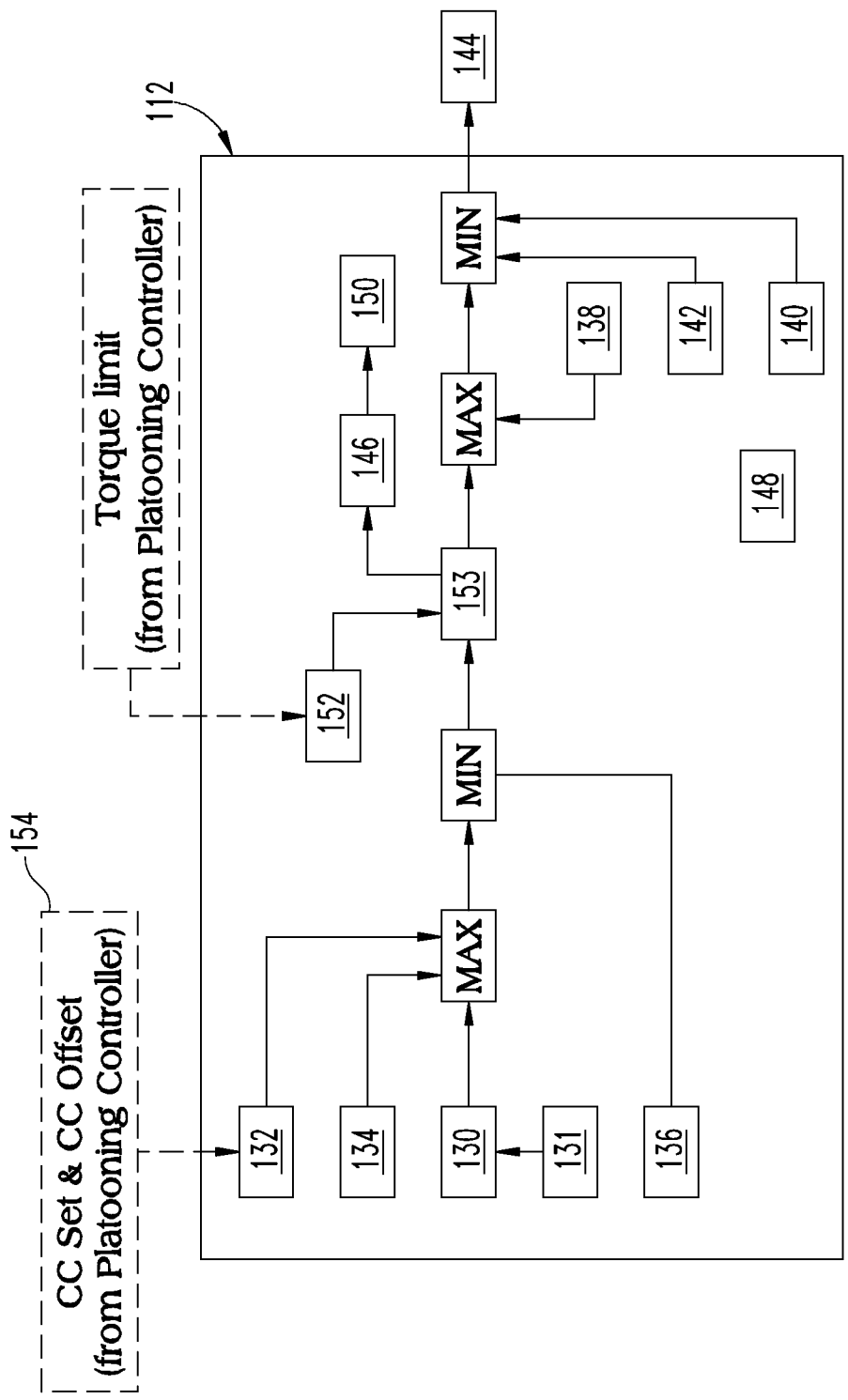
FIG. 2 is a schematic diagram illustrating certain aspects of an exemplary engine controller.

With reference to FIG. 2 there is illustrated a schematic diagram illustrating certain aspects of an exemplary engine controller 112. The engine controller 112 implements a plurality of torque request control components including a driver input 130 and associated accelerator pedal 131, a cruise control input 132 and other input 134. Each of these control components is structured to provide a torque request in response to its respective input(s) for one or more torque/speed control messages 151.

The engine controller 112 also implements a plurality of torque constraints including a road speed governor 136, an idle governor 138, a full load governor 140 for smoke control, and an engine protection governor 142. The output signals of these torque request control components are connected in the illustrated manner with a number of operators including Min operators operable to output the minimum of a plurality of inputs, Max operators operable to output the maximum of a plurality of inputs and mode control or override selections. The ultimate output of the engine controller is an actual engine torque 144 which is realized by the engine. Additionally, four engine controller signals are transmitted to the communication network 118: driver powertrain demand torque 146, actual engine torque 144, nominal friction torque 148, and engine desired operating speed 150. These outputs to the communication network 118 may be utilized by other controllers such as a transmission controller (not shown).

It shall be appreciated that external torque commands (including, for example, traction and transmission control) can also effect control of the engine by the engine controller 112 by means of a direct torque control signal such as a torque/speed control message 152 that is provided as an input to the control mode input operator 153 of engine controller 112. Torque/speed control message 152 can be received from platooning controller 114. Commands from control mode input operator 153 can influence the engine torque by four control modes—normal control mode, speed control mode, torque control mode, and speed/torque limit control. Furthermore, the aforementioned torque request control components 130, 132, 134 that drive torque commands can be superseded by the torque/speed control signal 152, which can be selected by the torque control mode input operator 153. There are also some exceptions to the superseding of the torque control mode of torque request control components 130, 132, 134, including torque curve, combustion and charge derates, and other higher priority torque/speed control messages.

In the illustrated embodiment the torque/speed control message 152 provided to control mode input operator 153 is a torque limit value provided by platooning controller 114. A cruise control set command (CC Set) and a cruise control offset value (CC Offset), referred to together as [CC Set+CC Offset] 154, are also provided by platooning controller 114 as inputs to the cruise control torque request component 132. By selecting the values of [CC Set and CC Offset] 154, the platooning controller 114 can influence operation of the engine controller 112 to provide a torque request to the control mode input operator 153 that establishes and provides a torque corresponding to maximum acceleration available to maintain or provide a desired following distance D. The torque limit in torque/speed control message 152 from the platooning controller 114 can be used to back off of or reduce this maximum. The [CC Set+CC Offset] 154 and corresponding maximum acceleration available to the platooning controller 114 can be selected at any torque magnitude up to the maximum torque magnitude that can be provided by the engine.

In some forms the [CC Set+CC Offset] 154 and corresponding maximum acceleration available to the platooning controller 114 can be selected to provide a desired acceleration capability and corresponding torque that is less than the maximum torque magnitude that can be provided by the engine. This provides effective or virtual full authority control over engine operation by the platooning controller 114 without requiring a direct torque control command that specifies an explicit override for all other torque request components.

Figure 3:
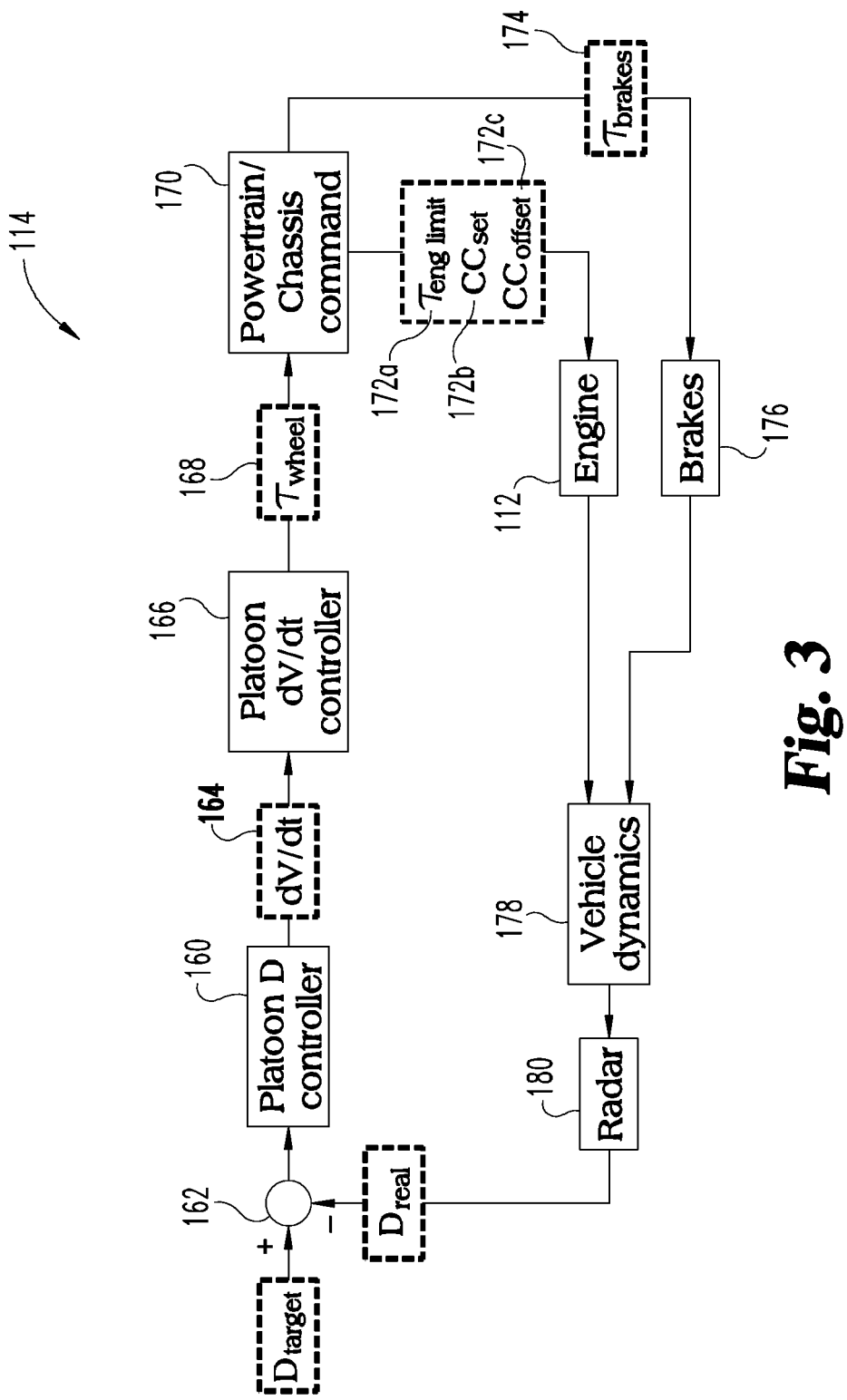
FIG. 3 is a schematic diagram illustrating certain aspects of an exemplary autonomous controller, such as a platooning controller.

With reference to FIG. 3 there is illustrated a schematic diagram illustrating certain aspects of an exemplary platooning controller 114. The platooning controller 114 is provided as a feedback controller, such as a PID, PI or similar type controller that operates to control a vehicle following distance D by reducing the error between a target distance ($D_{target}$) and an actual distance ($D_{real}$) received as feedback. However, as discussed above, the platooning controller 114 may be any suitable autonomous controller, and be used to control any suitable operating parameter in addition to or instead of a desired following distance, including a desired vehicle acceleration, desired vehicle velocity, or other suitable operating parameter.

The platoon distance (Platoon D) controller component 160 receives the difference 162 between $D_{target}$ and $D_{real}$ and determines an acceleration 164 that is provided to the platoon acceleration control component 166. The platoon acceleration (dV/dt) control component 166 determines a target wheel torque 168 which is provided to a powertrain/chassis control component 170. The powertrain/chassis control component 170 determines a torque limit ($t_{eng\ limit}$) 172a, a cruise control set command (CCset) 172b and a cruise control offset (CCoffset) 172c which are provided to the engine controller 112 to influence control of the engine (or other prime mover) as described above. The powertrain/chassis control component 170 may also determine a braking torque limit ($t_{brakes}$) 174 that is provided to a braking controller 176. The outputs from engine controller 112 and braking controller 176 are used to determine vehicle dynamics 178. Radar 180 and the vehicle dynamics are used to repeatedly determine $D_{real}$.

The torque limit 172a, cruise control set command 172b and cruise control offset 172c may be transmitted via the communication network 118. The torque limit 172a may be transmitted as a torque/speed control message. The cruise control set command 172b may be transmitted as a modified cruise control/vehicle speed message such as illustrated in FIG. 7 or an engine-specific or platform-specific message. The cruise control offset 172c may also be transmitted as a modified cruise control/vehicle speed message or an engine-specific or platform-specific message.

The platooning controller 114 performs a procedure in which (a) engine CC set speed establishes current vehicle speed as the CC set speed 172a, (b) CC offset 172b tells the engine that higher cruise control speed is desired as indicated by [CC set speed+CC offset] 154, (c) the engine cruise control governor attempts to achieve [CC set speed+CC offset] 154 by increasing engine output torque, (d) however the platooning controller 114 limits the engine output torque by torque limit 172a thereby preventing the vehicle 102 from achieving [CC set speed+CC offset] 154, (e) the engine cruise control governor continues to attempt to achieve [CC set speed+CC offset] 154 and eventually maxes out torque demand to the torque limit curve, and (f) the torque limit based control has virtual or effective full authority of torque output of the engine or other prime mover as long as actual speed <[CC set speed+CC offset] 154.

Figure 4:
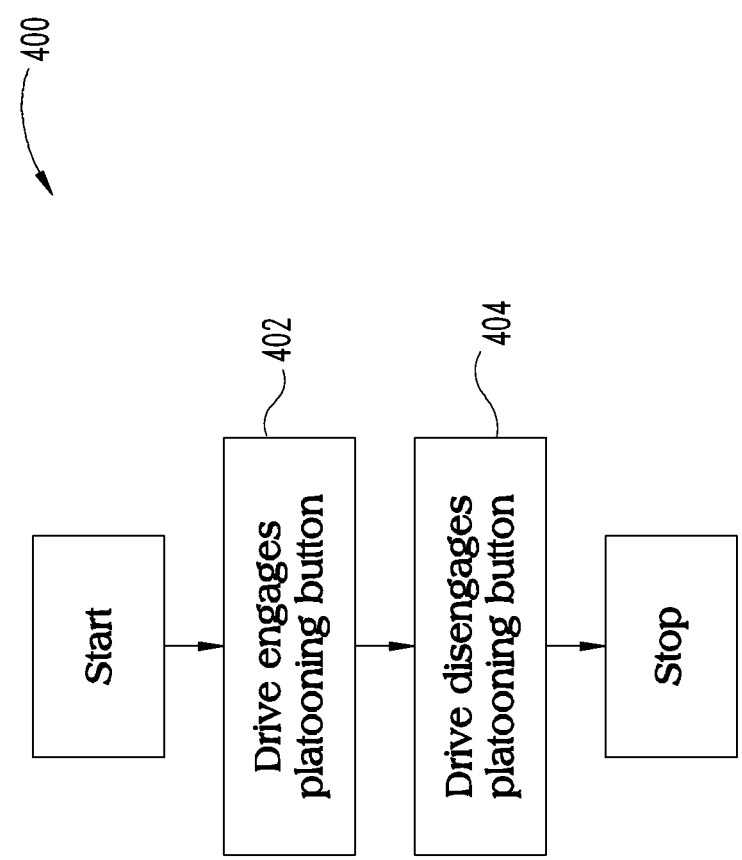
FIG. 4 is a flow diagram illustrating certain aspects of an exemplary driver process.

With reference to FIG. 4 there is illustrated a flow diagram 400 illustrating certain aspects of an exemplary driver process. The illustrated flow diagram generally denotes the operations performed by a driver of the vehicle 102 during platooning operation in accordance with the present disclosure. The operations of FIG. 4 may occur concurrently with the operations of one or both of FIG. 5 and FIG. 6. Further aspects of the operations and conditionals associated with the elements of FIG. 4 include a driver engaging a platooning button or input in vehicle 102 at block 402 to operate in the platoon 100, and disengaging a platooning button or input at block 404 to operate outside of the platoon 100.

Figure 5:
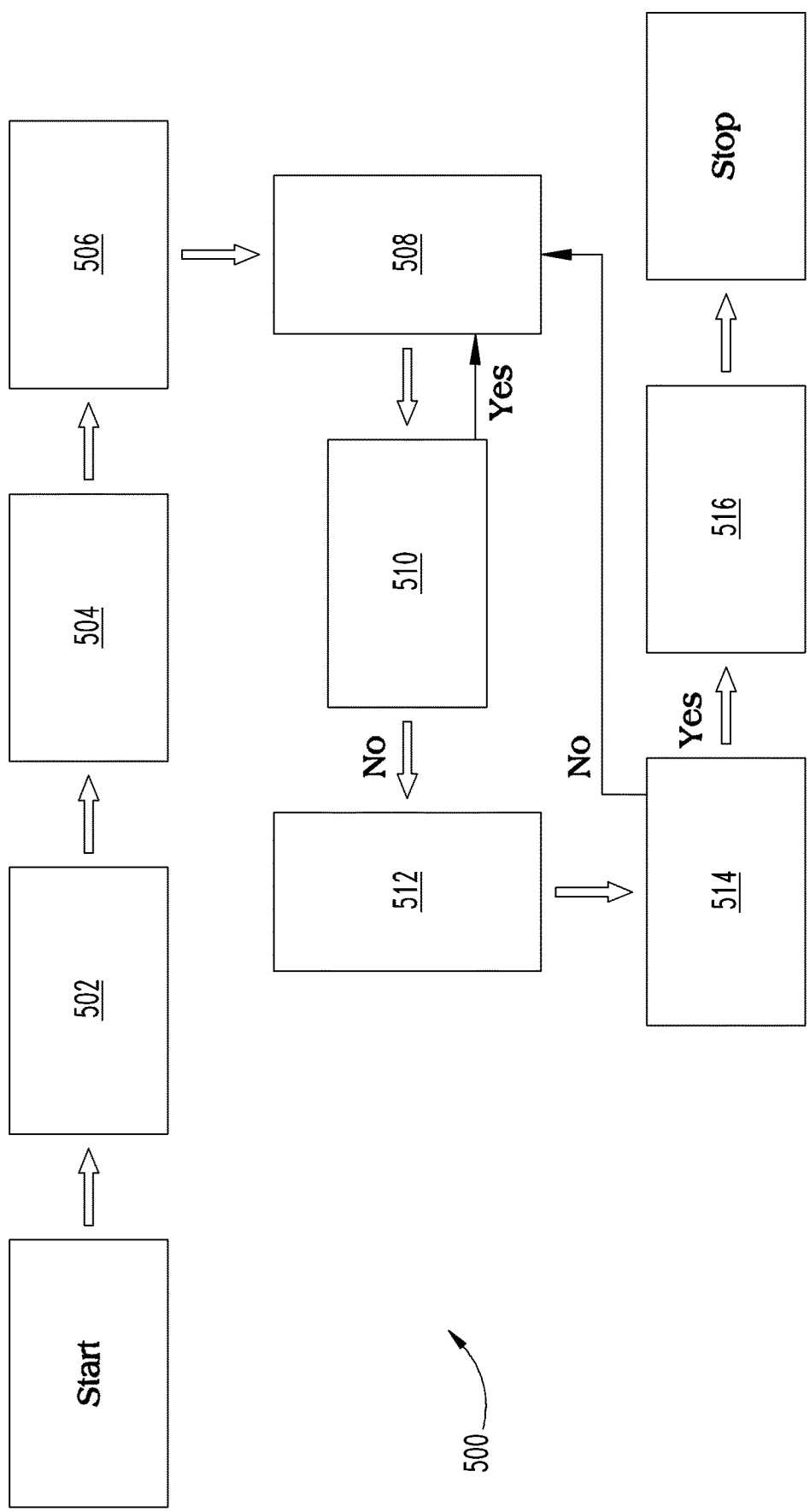
FIG. 5 is a flow diagram illustrating certain aspects of an exemplary platooning controller process.

With reference to FIG. 5 there is illustrated a flow diagram illustrating certain aspects of an exemplary platooning controller process 500. The illustrated flow diagram generally denotes the operations performed by a platooning controller 114 during platooning operation in accordance with the present disclosure. The operations of FIG. 5 may occur concurrently with the operations of one or both of FIG. 4 and FIG. 6.

Further aspects of the operations and conditionals associated with the elements of FIG. 5 include an operation block 502 in which the platooning controller 114 receives a platoon engage command; an operation block 504 in which the modified cruise control/vehicle speed enable command and CC set command 172b are sent to the engine controller (ECM) 112; an operation block 506 in which the cruise control offset command 172c is sent to the engine controller 112 from the platooning controller 114; and an operation block 508 in which platooning controller 114 limits engine output torque in response to torque limit 172a in the torque/speed control message 152 to achieve desired trailing vehicle acceleration to maintain separation distance D.

Process 500 continues at conditional block 510 to check to determine if full torque authority is available to the torque limit signal. Full torque authority may not be available if actual vehicle speed is approaching that of the [CC set speed+CC offset] 154. If conditional block 510 is true, process 500 returns to operation block 508. If conditional block 510 is false, process 500 continues at operation block 512 where, if full authority is not available, the modified cruise control/vehicle speed set command is re-sent to the engine controller 112 to increase the CC set speed to current vehicle speed, and the cruise control offset command is re-sent to the engine controller 112. Process 500, at conditional block 514, checks if platooning controller 114 received a disengage platoon command. If conditional block 514 is true, process 500 continues at operation block 516 where the modified cruise control/vehicle speed cancel command is sent to the engine controller 112 from the platooning controller 114 and platooning is stopped. If conditional block 514 is false, process 500 returns to operation block 508.

Figure 6:
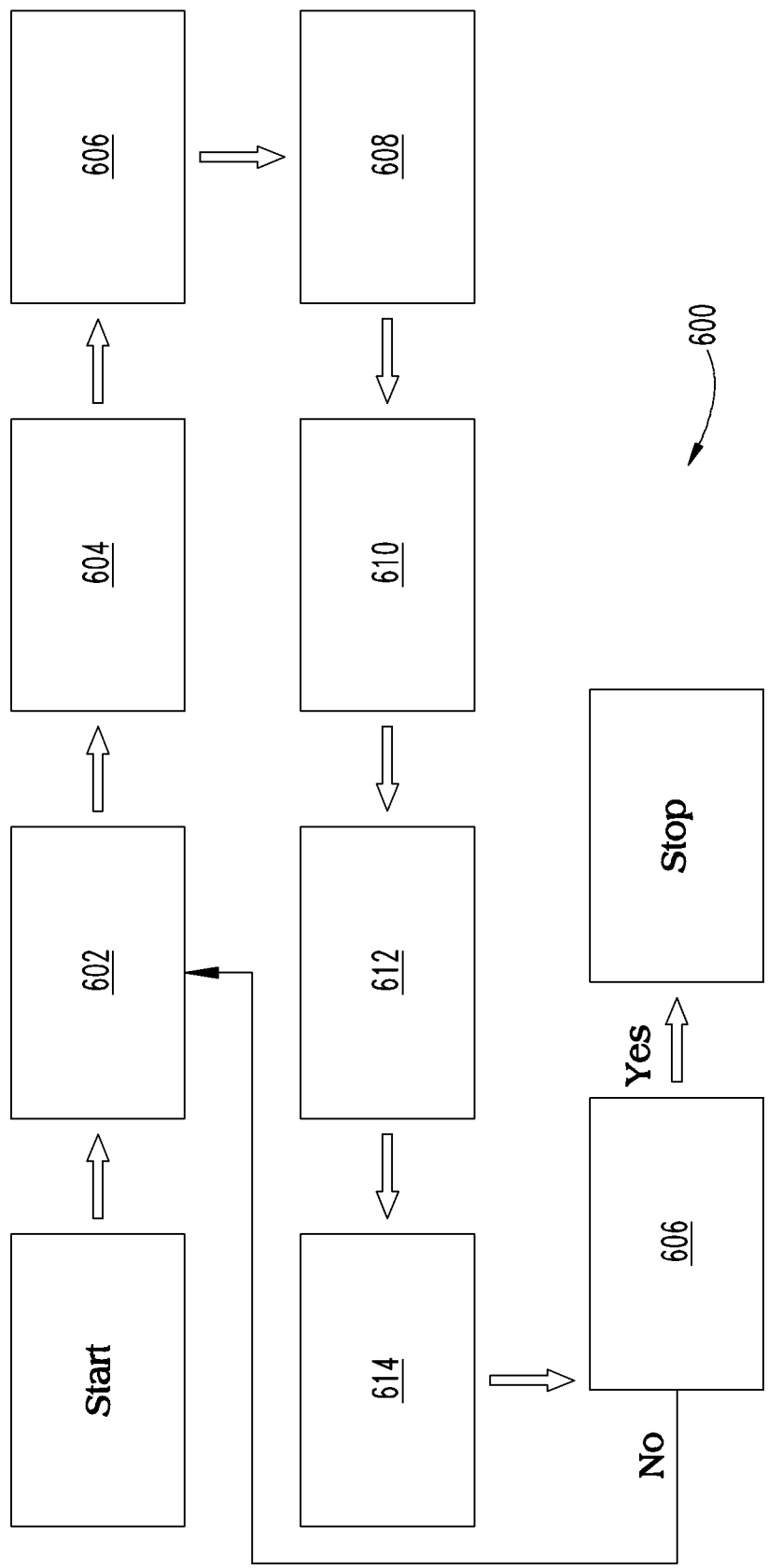
FIG. 6 is a flow diagram illustrating certain aspects of an exemplary engine controller process.

With reference to FIG. 6 there is illustrated a flow diagram illustrating certain aspects of an exemplary engine controller process 600. The illustrated flow diagram generally denotes the operations performed by an engine controller 112 during platooning operation in accordance with the present disclosure. The operations of FIG. 6 may occur concurrently with the operations of one or both of FIG. 4 and FIG. 5.

Further aspects of the operations and conditionals associated with the elements of FIG. 6 include an operation block 602 for engine controller 112 to receive the modified cruise control/vehicle speed enable and set commands. Process 600 continues at operation block 604 in which the current vehicle speed becomes the CC set speed for the engine cruise control governor 132. Process 600 continues at operation block 606 in which engine controller 112 receives the CC offset command. At operation block 608 the [CC set speed+CC offset] 154 becomes the cruise control governor target.

Process 600 continues at operation block 610 in which the engine cruise control governor 132 increases torque in an effort to achieve the [CC set speed+CC offset] 154. Process 600 continues at operation block 612 to receive the torque/speed control torque limit command 152, and then at operation block 614 to output the lower of the CC governor torque and the torque/speed control torque limit. At conditional block 616, process 600 checks if a modified cruise control/vehicle speed cancel is received. If conditional block 616 is false, process 600 returns to operation block 602. If conditional block 616 is true, process 600 ends.

With reference to FIG. 7 there is illustrated a table 700 that shows certain aspects of an exemplary extended modified cruise control/vehicle speed message structure for parameter groups such as the modified cruise control/vehicle speed, accelerator (ACC) and engine. The parameter groups are associated with various specific parameters including a cruise control disable command, a cruise control resume command, a cruise control pause command, and a cruise control set command. The specific parameters can be communicated using any suitable vehicle communication structure, such as those indicated in table 700.

In certain forms the modified cruise control/vehicle speed message may also include a CC offset value. In certain forms one or both of the CC set command and the CC offset value may be transmitted or broadcast over a communication using alternate message formats or signals. The modified cruise control/vehicle speed message is designed to allow a logic based decision on enabling cruise control. The modified cruise control/vehicle speed message includes enable, set, resume and cancel commands that allow a third party or ex-engine controller device to take control of the cruise system through datalink messaging. This mitigates any need for the operator to set cruise control using the dash switches. It would also eliminate a need to provide alternate signals into the ECM either directly or via dummy datalink messages.

In one embodiment, once a modified cruise control/vehicle speed message is issued (e.g. on-ramp or during highway operation) for the following vehicle of a platoon, the vehicle cruise speed is the current vehicle speed. This is then followed with another message, which may be similar to a predictive cruise control (PCC) message that allows varied cruise control operation, providing an offset from the current setpoint speed that is sufficiently high such that torque demand would try to increase the vehicle speed. The offset information message could alternatively be incorporated into the modified cruise control/vehicle speed message. At this point the platooning controller 114 can issue a torque limit command to govern the torque down as needed based on the feedback to maintain desired separation distance D. As long as the target cruise speed is sufficiently greater than the speed needed to maintain the separation distance D, then the cruise governor torque will tend to be at peak torque levels. Thus with the torque limit control, ideally the torque output may be controlled through its full range and with continuity.

In the event that the target cruise speed [CC setpoint+CC offset] 154 is no longer sufficiently greater than the speed needed to maintain the separation distance D (e.g. the lead truck may have increased its speed), a new modified cruise control/vehicle speed message may be issued, followed by the CC offset message. This will in effect increase the setpoint to the current speed and provide an additional incremental offset. This may be done as many times as necessary so that the [CC setpoint+CC offset] 154 is sufficiently larger than the desired speed to maintain separation distance. It should be appreciated that once the modified cruise control/vehicle speed message is issued the engine operates the vehicle under a cruise control governor state. This would provide a clear "driver torque demand" on the datalink to other devices such as the transmission. This driver torque demand can then be used to help guide the shift schedule.

Various aspects of the present disclosure are contemplated. According to one aspect, a control system for a vehicle includes an engine controller operable to determine a requested engine torque in response to a cruise control set command and a cruise control offset value, determine an engine torque command in response to the requested engine torque and a torque limit, and control operation of an engine in response to the engine torque command. The control system also includes an autonomous controller operable to determine and provide to the engine controller the cruise control set command, the cruise control offset value and the torque limit effective to cause the engine controller to control the engine to provide a target operating parameter for the vehicle.

In one embodiment, the autonomous controller is a platooning controller that is configured to determine the cruise control set command, the cruise control offset value and the torque limit in response a difference between the target following distance and a real following distance from the second vehicle.

In another embodiment, the autonomous controller is a platooning controller that includes a platoon distance control component configured to determine an acceleration response based on a difference between a target following distance for the vehicle and a real following distance for the vehicle. In a refinement of this embodiment, the platooning controller includes an acceleration control component that determines a wheel torque in response to the acceleration response. In a further refinement, the platooning controller includes a powertrain command control component that is configured to determine the cruise control set command, the cruise control offset value and the torque limit in response to the wheel torque. In another refinement, the powertrain command control component is further configured to determine a brake torque.

In another embodiment, the autonomous controller is operable to provide the cruise control set command and the cruise control offset value to the engine controller via one or more messages broadcast over a communication network. In yet another embodiment, the autonomous controller is operable to provide the cruise control set command and the cruise control offset value to the engine controller via one or more extended modified cruise control/vehicle speed messages, the extended modified cruise control/vehicle speed messages including a cruise control set command parameter and a cruise control offset parameter.

In a further embodiment, the autonomous controller is operable to provide the torque limit to the engine controller via one or more messages broadcast over a communication network. In yet another embodiment, the autonomous controller is operable to provide the torque limit to the engine controller via one or more torque/speed control messages. In still another embodiment, the engine controller is operable to broadcast the requested engine torque over a communication network to control a transmission gear selection in response to the broadcast requested engine torque.

In another aspect, a method for operating a vehicle includes: determining, with an autonomous controller, a cruise control set command, a cruise control offset value and a torque limit effective for the vehicle to provide a target operating parameter for the vehicle; determining, with an engine controller of the vehicle, a requested engine torque in response to the cruise control set command and the cruise control offset value from the autonomous controller; determining, with the engine controller, an engine torque command in response to the requested engine torque and the torque limit from the autonomous controller; and controlling operation of an engine of the vehicle in response to the engine torque command.

In one embodiment, the method includes determining, with the autonomous controller, an acceleration response based on a difference between a target following distance for the vehicle and a real following distance for the vehicle. In a refinement of this embodiment, the method includes determining, with the autonomous controller, a wheel torque based on the acceleration response. In a further refinement of the method, the autonomous controller includes a powertrain command control component that is configured to determine the cruise control set command, the cruise control offset value and the torque limit in response to the wheel torque. In another refinement, the powertrain command control component further determines a brake torque in response to the wheel torque.

In another embodiment, the method includes broadcasting the cruise control set command, the cruise control offset value, and the torque limit from the autonomous controller to the engine controller over a communication network.

According to another aspect, a method for operating a vehicle in a platoon includes: receiving a platoon engage command at a platooning controller of the vehicle; transmitting a cruise control set speed, a cruise control offset, and a torque limit from the platooning controller to an engine controller of the vehicle to maintain a target distance of the vehicle from a second vehicle; determining, with the engine controller, a cruise control governor target torque in response to the cruise control set speed and the cruise control offset; limiting an engine torque command from the engine controller in response to the cruise control target torque and the torque limit; and operating the engine in response to the engine torque command.

In one embodiment, the platooning controller transmits the cruise control set speed and the cruise control offset to the engine controller via one or more modified cruise control/vehicle speed messages. In another embodiment, the platooning controller transmits the torque limit to the engine controller with one or more torque/speed control messages.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A control system for a vehicle comprising:
   an engine controller operable to determine a requested engine torque in response to a cruise control set command and a cruise control offset value, determine an engine torque command in response to the requested engine torque and a torque limit, and control operation of an engine in response to the engine torque command; and
   an autonomous controller operable to determine and provide to the engine controller the cruise control set command, the cruise control offset value and the torque limit effective to cause the engine controller to control the engine to provide a target operating parameter for the vehicle.

2. The control system according to claim 1, wherein the autonomous controller is a platooning controller, and the platooning controller is configured to determine the cruise control set command, the cruise control offset value and the torque limit in response to a difference between a target following distance and a real following distance of the vehicle from a second vehicle.

3. The control system according to claim 1, wherein the autonomous controller is a platooning controller, and the platooning controller includes a platoon distance control component configured to determine an acceleration response based on a difference between a target following distance for the vehicle and a real following distance for the vehicle.

4. The control system according to claim 3, wherein the platooning controller includes an acceleration control component that determines a wheel torque in response to the acceleration response.

5. The control system according to claim 4, wherein the platooning controller includes a powertrain command control component that is configured to determine the cruise control set command, the cruise control offset value and the torque limit in response to the wheel torque.

6. The control system according to claim 5, wherein the powertrain command control component is further configured to determine a brake torque.

7. The control system according to claim 1, wherein the autonomous controller is operable to provide the cruise control set command and the cruise control offset value to the engine controller.

8. The control system according to claim 1, wherein the autonomous controller is operable to provide the torque limit to the engine controller.

9. The control system according to claim 1, wherein the engine controller is operable to provide the requested engine torque to control a transmission gear selection in response to the requested engine torque.

10. A method for operating a vehicle, comprising:
    determining, with an autonomous controller, a cruise control set command, a cruise control offset value and a torque limit effective for the vehicle to provide a target operating parameter;
    determining, with an engine controller of the vehicle, a requested engine torque in response to the cruise control set command and the cruise control offset value from the autonomous controller;
    determining, with the engine controller, an engine torque command in response to the requested engine torque and the torque limit from the autonomous controller; and
    controlling operation of an engine of the vehicle in response to the engine torque command.

11. The method according to claim 10, wherein the target operating parameter is a target following distance of the vehicle from a second vehicle, and further comprising determining, with the autonomous controller, an acceleration response based on a difference between the target following distance for the vehicle and a real following distance for the vehicle.

12. The method according to claim 11, further comprising determining, with the autonomous controller, a wheel torque based on the acceleration response.

13. The method according to claim 12, wherein the autonomous controller includes a powertrain command control component that is configured to determine the cruise control set command, the cruise control offset value and the torque limit in response to the wheel torque.

14. The method according to claim 13, wherein the powertrain command control component further determines a brake torque in response to the wheel torque.

15. The method according to claim 10, further comprising broadcasting the cruise control set command, the cruise control offset value, and the torque limit from the autonomous controller to the engine controller.

16. A method for operating a vehicle in a platoon, comprising:
    receiving a platoon engage command at a platooning controller of the vehicle;
    providing a cruise control set speed, a cruise control offset, and a torque limit from the platooning controller to an engine controller of the vehicle to maintain a target distance of the vehicle from a second vehicle;
    determining, with the engine controller, a cruise control governor target torque in response to the cruise control set speed and the cruise control offset;
    limiting an engine torque command from the engine controller in response to the cruise control governor target torque and the torque limit; and
    operating an engine in response to the engine torque command.

17. The method of claim 16, wherein the platooning controller provides the cruise control set speed and the cruise control offset to the engine controller.

18. The method of claim 16, wherein the platooning controller provides the torque limit to the engine controller.

* * * * *